(12) United States Patent
Lee et al.

(10) Patent No.: US 8,469,847 B2
(45) Date of Patent: Jun. 25, 2013

(54) INTEGRATED SINGLE MOTOR HYBRID TRANSMISSION USING REAR-WHEEL-DRIVE 8-SPEED TRANSMISSION

(75) Inventors: Chunhao J. Lee, Troy, MI (US); Farzad Samie, Franklin, MI (US); Norman K. Bucknor, Troy, MI (US); Kumaraswamy V. Hebbale, Troy, MI (US); Anthony L. Smith, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 13/023,955

(22) Filed: Feb. 9, 2011

(65) Prior Publication Data

US 2012/0202635 A1  Aug. 9, 2012

(51) Int. Cl.
*F16H 3/72* (2006.01)
(52) U.S. Cl.
USPC .............................................. 475/5
(58) Field of Classification Search
USPC ... 475/1, 5, 277, 279, 282, 288, 290; 903/911
See application file for complete search history.

(56) References Cited

U.S. PATENT DOCUMENTS

| | | | |
|---|---|---|---|
| 7,914,416 B2* | 3/2011 | Maguire et al. | 477/5 |
| 2007/0293362 A1* | 12/2007 | Kamada et al. | 475/5 |
| 2009/0229393 A1* | 9/2009 | Shibata et al. | 74/335 |
| 2010/0069191 A1* | 3/2010 | Swales et al. | 475/5 |
| 2010/0234159 A1 | 9/2010 | Lee et al. | |

OTHER PUBLICATIONS

U.S. Appl. No. 12/956,254, not published, Farzad et al.

* cited by examiner

*Primary Examiner* — David D Le
*Assistant Examiner* — David J Hlavka

(57) ABSTRACT

An apparatus transmitting torque among a first torque generative device, a second torque generative device and an output member includes a first planetary gear set including respective first, second and third members, a second planetary gear set including respective first, second and third members, the respective first member of the second planetary gear set mechanically coupled to the respective first member of the first planetary gear set. The first torque generative device is mechanically coupled to the respective second member of the first planetary gear set. The second torque generative device is mechanically coupled to the respective second member of the second planetary gear set, wherein the second torque generative device includes a grounding state wherein rotation of the respective second member of the second planetary gear set is prevented and a rotational state wherein rotation of the respective second member of the second planetary gear set is not prevented.

18 Claims, 3 Drawing Sheets

INTEGRATED SINGLE MOTOR HYBRID TRANSMISSION USING REAR-WHEEL-DRIVE 8-SPEED TRANSMISSION

TECHNICAL FIELD

This disclosure is related to a system and method for controlling a hybrid powertrain.

BACKGROUND

The statements in this section merely provide background information related to the present disclosure and may not constitute prior art.

A powertrain includes a torque generative device providing torque to a shaft. A hybrid powertrain utilizes at least two torque generative devices, for example an internal combustion engine and one or more electric machines. Planetary gear sets including a ring gear, a sun gear, planet gears and planet carrier, may be employed in hybrid transmissions and configured to selectively receive and transmit torque through the various gear members. Clutch devices can selectively connect and disconnect various members within the powertrain, including various members of planetary gear sets.

A powertrain utilizing a rotational input torque through an input shaft to drive a transmission input shaft is known to utilize a transmission to change gear states establishing a relationship of the input to the output. Operation of the above devices within a powertrain requires management of numerous torque bearing shafts or devices representing connections to the engine, electrical machines, and transmission input shaft or driveline. Planetary gear sets and clutch devices are also known to be utilized within a transmission, providing a number of gear states that the transmission can be operated within based upon the configuration of the engaged and disengaged clutches and the transmission of torque through the various gears and gear sets within the planetary gear sets.

SUMMARY

An apparatus transmitting torque among a first torque generative device, a second torque generative device and an output member includes a first planetary gear set including respective first, second and third members, a second planetary gear set including respective first, second and third members, the respective first member of the second planetary gear set mechanically coupled to the respective first member of the first planetary gear set. The first torque generative device is mechanically coupled to the respective second member of the first planetary gear set. The second torque generative device is mechanically coupled to the respective second member of the second planetary gear set, wherein the second torque generative device includes a grounding state wherein rotation of the respective second member of the second planetary gear set is prevented and a rotational state wherein rotation of the respective second member of the second planetary gear set is not prevented.

BRIEF DESCRIPTION OF THE DRAWINGS

One or more embodiments will now be described, by way of example, with reference to the accompanying drawings, in which.

DETAILED DESCRIPTION

Figure 1:
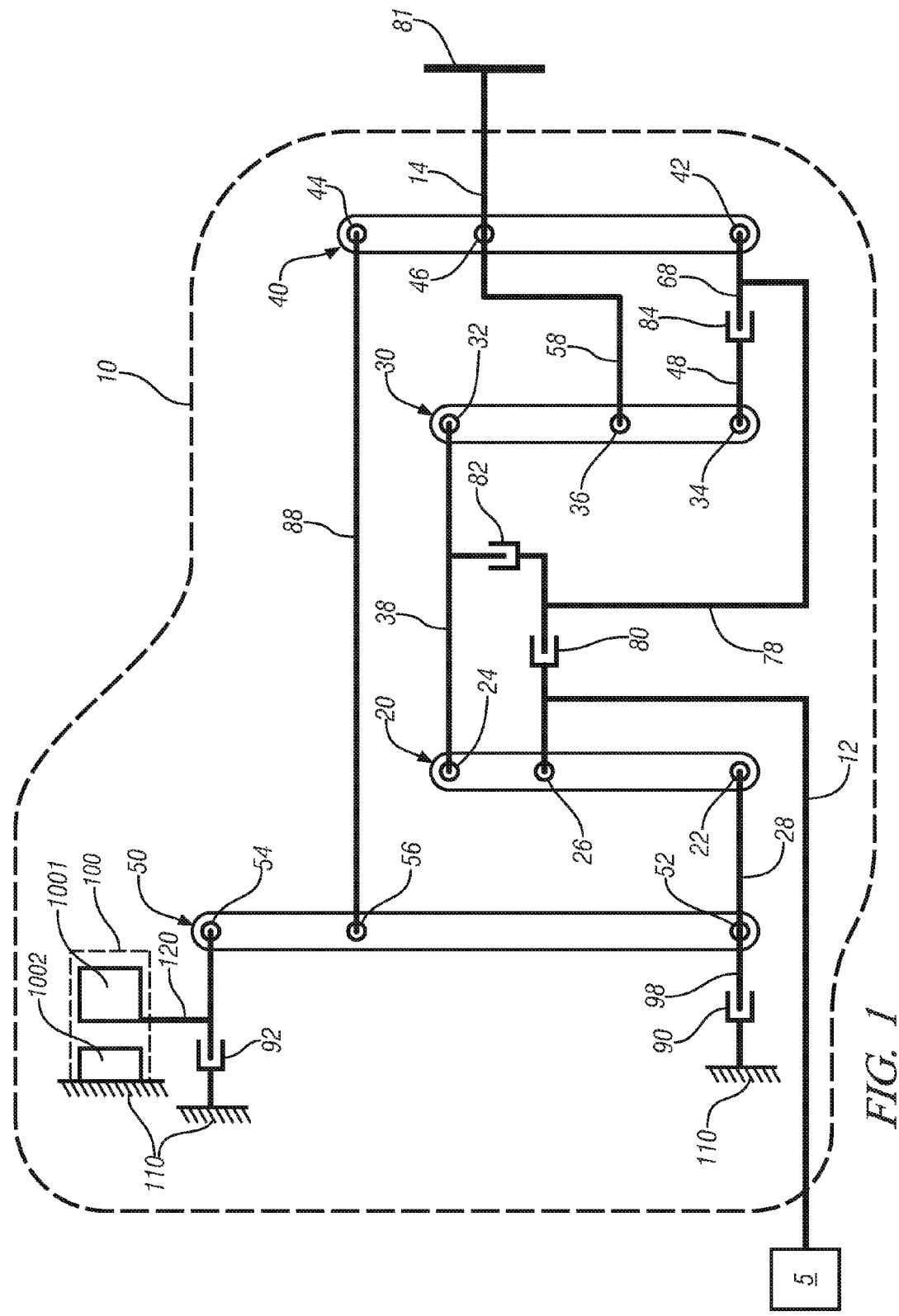
FIGS. 1 and 2 illustrate a lever diagram of a first exemplary hybrid transmission including a plurality of planetary gear sets and associated selectively engageable clutches connecting a plurality of torque generative devices to a transmission input shaft, in accordance with the present disclosure.
Figure 2:
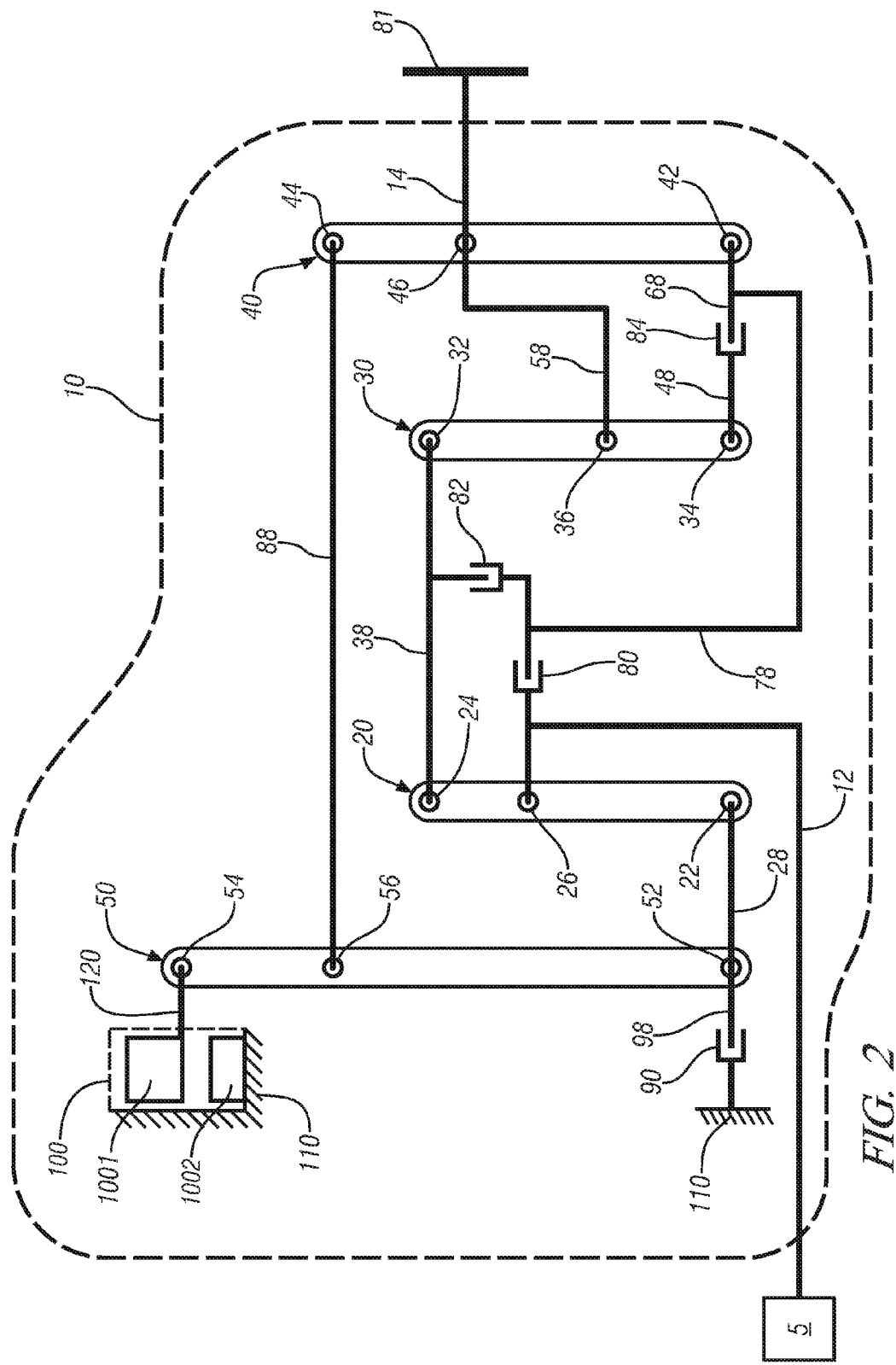

Referring now to the drawings, wherein the showings are for the purpose of illustrating certain exemplary embodiments only and not for the purpose of limiting the same, FIGS. 1 and 2 are lever diagrams of an exemplary eight-speed integrated hybrid transmission including first and second transmission input members, a plurality of planetary gear sets and associated selectively engageable torque transfer devices (hereafter clutches) for controlling power flow from one or both of the first and second transmission input members through the planetary gear sets to a transmission output member. The first transmission input member 12 (first input member 12) is mechanically coupled to a first torque generative device (engine 5) supplying engine torque, $T_E$. The second transmission input member 120 (second input member 120) is mechanically coupled to a second torque generative device (electric machine 100) supplying motor torque, $T_M$. The transmission output member 14 supplying output torque, $T_O$, is mechanically coupled with a vehicle driveline 81. In the exemplary embodiment, the integrated hybrid transmission 10 (transmission 10) is an eight-speed transmission configured for operation with a rear-wheel drive vehicle.

The engine 5 includes a multi-cylinder internal combustion engine operative to transfer torque to the transmission 10 via the first input member 12, and can be configured to generate power by igniting a fuel/air charge in a combustion chamber using spark-ignition, compression-ignition, and other charge-ignition methods. The engine 5 includes a crankshaft coupled to the first input member 12 of the transmission 10. It is appreciated that torque-consuming components can be positioned on the first input member 12 between the engine 5 and the transmission 12, including an isolation device, a torque converter device including a torque converter clutch, and a hydraulic pump. Engine states can include one of an engine-on state and an engine-off state, with the engine-off state consisting of the crankshaft of the engine 5 not spinning and the engine un-fueled. When the engine 5 is in the engine-on state, i.e., with the engine 5 spinning, the engine 5 can be operating in either of a fueled state or a fuel-cutoff state.

The electric machine 100 includes an electric motor/generator. The electric machine 100 includes a rotor 1001 rotatably coupled to the second input member 120 and a stator 1002 integrated into a hardware structure, i.e., a housing 110 of the transmission 10. The electric machine 100 generates tractive power by discharging potential energy stored in an energy storage device, e.g., a high voltage electrical battery. The electric machine 100 operates in a regenerative power braking mode by generating reactive torque that can react with driveline torque to transform vehicle kinetic energy to storable electric energy during a braking or coasting operation of the vehicle.

The transmission 10 transfers mechanical power among the engine 5, the electric machine 100 and the driveline 81. The engine 5 and the electric machine 100, via the first and second input members 12,120, respectively, are controllable to generate mechanical power that can be used as tractive torque through the transmission 10 to the driveline 81. The engine 5 and the transmission 10 are controllable to generate mechanical power that can be transferred to the electric machine 100 to generate electrical power. The transmission 10 is controllable to transfer mechanical power in the form of reactive torque from the output member 14 to the electric machine 100 to generate electrical power through regenerative braking.

The exemplary eight-speed transmission 10 includes planetary gear sets 20, 30, 40 and 50. Each of the planetary gear sets 20, 30, 40 and 50 includes a sun gear member (a first element), a ring gear member (a second element) and a planet carrier member (a third element). As used herein, the term "coupled" includes any coupling, including direct mechanical linkages, belt linkages, and other couplings that enable transfer of mechanical power between elements of the system. The first planetary gear set 20 can include a first sun gear member 22, a first ring gear member 24 and a first planet carrier member 26 rotatably supporting a first plurality of planet gears configured to intermesh with the first sun gear member 22 and the first ring gear member 24. The first sun gear member 22 is coupled for common rotation with a first intermediate member 28. The first ring gear member 24 is coupled for common rotation with a second intermediate member 38. The first planet carrier member 26 is coupled for common rotation with the first transmission input member 12. Hence, the engine 5 is mechanically coupled to the first planetary gear set 20.

The second planetary gear set 30 includes a second sun gear member 32, a second ring gear member 34 and a second planet carrier member 36 rotatably supporting a second plurality of planet gears configured to intermesh with both the second sun gear member 32 and the second ring gear member 34. The second sun gear member 32 is coupled for common rotation with the second intermediate member 38. The second ring gear member 34 is coupled for common rotation with a third intermediate member 48. The second carrier member 36 is coupled for common rotation with a fourth intermediate member 58.

The third planetary gear set 40 includes a third sun gear member 42, a third ring gear member 44 and a third planet carrier member 46 rotatably supporting a third plurality of planet gears configured to intermesh with both the third sun gear member 42 and the third ring gear member 44. The third sun gear member 42 is coupled for common rotation with a fifth intermediate shaft 68 and a sixth intermediate member 78. The third ring gear member 44 is coupled for common rotation with a seventh intermediate member 88. The third carrier member 46 is coupled for common rotation with the output member 14.

The fourth planetary gear set 50 includes a fourth sun gear member 52, a fourth ring gear member 54 and a fourth planet carrier member 56 rotatably supporting a fourth plurality of planet gears configured to intermesh with both the fourth sun gear member 52 and the fourth ring gear member 54. The fourth sun gear member 52 is coupled for common rotation with a first outer member 98 and the first intermediate member 28. The fourth ring gear member 54 is coupled for common rotation with the second input member 120. Hence, the electric machine 100 can be mechanically coupled to the fourth planetary gear set 50. The fourth carrier member 56 is coupled for common rotation with the seventh intermediate member 88.

The transmission 10 operates by selective application of clutches 90, 80, 82, 84 and 92. Clutches 90, 80, 82, 84 and 92 can include clutches that are activated either to a coupled or applied state, locking and/or grounding the associated members, or to a decoupled or released state, permitting the associated members to spin freely of each other. Exemplary embodiments of clutches 90, 80, 82, 84 and 92 include hydraulically activated clutches. Hydraulic pressure can be utilized to activate a clutch, though other application techniques are known. An exemplary shift between gear states controlled by a pair of clutches requires that one clutch be released unloaded, permitting two members that were previously coupled to spin freely of each other, and subsequently that another clutch be applied or loaded, coupling two members that were formerly decoupled or free to spin relative to one another. Such hydraulically activated clutches frequently include clutch plates that are spring loaded to a default decoupled or released state, and hydraulic pressure applied to an associated piston applies pressure that overcomes the bias of the spring to bring the plates to a coupled or applied state. Pressure to the clutch is controlled in order to establish the clutch in a locked or applied state or in an unlocked or released state. In some embodiments, a middle or slip state can be controlled in the clutch.

In an exemplary embodiment of the present disclosure, clutches 80,82,84 include hydraulically-applied rotating friction clutches and clutches 90,92 include hydraulically-applied grounding devices that can be selectively activated to ground rotation of associated members to the transmission housing 110.

Clutch 80 is selectively activated to couple the sixth intermediate member 78 to the first planet carrier member 26 and the first transmission input member 12. Hence, clutch 80 selectively couples rotation of the first planet carrier member 26 and the third sun gear member 42. Clutch 82 is selectively activated to couple the sixth intermediate shaft 78 to the second intermediate shaft 38. Hence, clutch 82 selectively couples rotation of the first ring gear member 24 and the third sun gear member 42. Clutch 84 is selectively activated to couple the third intermediate shaft 48 to the fifth intermediate shaft 68. Hence, clutch 84 selectively couples rotation of the second ring gear member 34 and the third sun gear member 42. Clutch 90 is selectively activated to couple the first outer shaft 98 to the housing 110 of the transmission 10 to restrict or inhibit rotation of the first outer member 98 and the fourth sun gear member 52 relative to the housing 110. In other words, clutch 90 selectively grounds rotation of the fourth sun gear member 52. Clutch 92 is selectively activated to couple the second input member 120 to the housing 110 of the transmission 10 to restrict or inhibit rotation of the second input member 120 and the fourth ring gear member 54 relative to the housing 100. In other words, clutch 92 selectively grounds rotation of the fourth ring gear member 54 and the second input member 120 to the housing 110.

As aforementioned, clutch 92 is a grounding device that can be selectively activated to ground associated members (the fourth ring gear member 54 and the second input member 120) to the transmission housing 110. Clutch 92 is co-located with the electric machine 100 on the second input member 120. In an exemplary alternative embodiment, with reference to FIG. 2, clutch 92 can be replaced by electric machine 100 where the electric machine 100 can be configured to ground rotation of the fourth ring gear member 54. Hence, in addition to generating torque and electrical power through the transmission 10 in some transmission operating states, the electric machine 100 can be operative as a grounding device when the transmission operating state requires the rotation of the fourth ring gear member 54 and the second input member 120 to be stationary and grounded. It will be appreciated that when the transmission operating state requires the electric machine 100 operative as the grounding device, the electric machine 100 generates a reactive or counter torque to inhibit or restrict movement of the fourth ring gear member 54. Throughout the specification, it will be appreciated that when the desired transmission operating state requires application of clutch 92 (grounding device), the electric machine 100 can be configured to replace clutch 92, wherein the electric machine 100 is operative as the grounding device to restrict or inhibit movement of the fourth ring gear member 54 and the second input member 120. Therefore, it is appreciated that the grounding device (clutch 92 in FIG. 1 or electric machine 100 in FIG. 2) enables the electric machine 100 to be selected to ground the fourth planetary gear set 50 via grounding the fourth ring gear member 54 or selected to transmit torque between the electric machine 100 and the fourth planetary gear set 50 via the fourth ring gear member 54.

In an exemplary embodiment of the present disclosure, the transmission 10 is selectively operative in a plurality of operating states, including a plurality of fixed gear states including a motor assisted (MA) transmission mode, electrically variable transmission state (EVT) and an electrical vehicle (EV) state. The EVT state can be referred to as a continuously variable transmission (CVT) state and the EV state can be referred to as an electric machine state (second generative torque device state). The MA transmission mode includes motor-assisted fixed gear states wherein tractive power is transferred to the output member 14 from the engine 5 and the electric machine 100 through the transmission 10 via the first and second input members 12,120, respectively. Furthermore, the plurality of fixed gear states can include electric generation fixed gear states wherein tractive power is transferred from the engine 5 to the output member 14 and electric charging power can be generated using the electric machine 100 via rotation of the second input member 120. The generated electrical power can be used to charge the energy storage device.

According to operation of clutches 80, 82, 84, 90 and 92 based upon a desired transmission operating state or mode, the transmission 10 is capable of transmitting torque through at least one of the first and second input members 12,120, respectively, to the output shaft 14 in the plurality of fixed planetary gear states including the MA transmission mode, EVT state and the EV state. As illustrated in FIG. 2, the electric machine 100 can be operative as a grounding device (supplanting clutch 92 of FIG. 1) based on the desired operating state of the transmission when the rotation of the fourth ring gear member 54 and the second input member 120 is to be grounded.

Table 1 provides exemplary operation of integrated hybrid transmission 10, in accordance with the present disclosure.

TABLE 1

| Gear State | Clutch 90 | Clutch 92 Motor/Gen. 100 | Clutch 82 | Clutch 80 | Clutch 84 |
|---|---|---|---|---|---|
| Reverse | x | x | | | x |
| Neutral | | | | | |
| $1^{st}$ | x | x | | x | |
| $2^{nd}$ | x | x | x | | |
| $3^{rd}$ | | x | x | x | |
| $4^{th}$ | | x | x | | x |
| $5^{th}$ | | x | | x | x |
| $6^{th}$ | | | x | x | x |
| $7^{th}$ | x | | | x | x |
| $8^{th}$ | x | | x | | x |
| EV (Eng. Off) | x | | | x | |
| Start Engine/EVT | x | | | x | |

Table 1 depicts applied (activated) ones (x) of the clutches 80, 82, 84, 90 and 92 achieving specific transmission states including reverse fixed gear ratio (Reverse), neutral, each of the forward fixed gear ratios ($1^{st}$, $2^{nd}$, $3^{rd}$, $4^{th}$, $5^{th}$, $6^{th}$, $7^{th}$ and $8^{th}$), the EV state and the EVT state. Discussed in greater detail below, the EVT state can be utilized to crank the engine from an engine-off state to an engine-on state utilizing motor torque, $T_M$, from the electric machine 100.

To establish the reverse fixed gear ratio, as shown in Table 1, clutches 90, 92 and 84 are activated and thus provide coupling between connecting members, such as coupling rotating members to each other and coupling rotating members to the housing 110. As described above, selectively applying clutch 92 grounds the second input member 120 and the fourth ring gear member 54 to the housing 110, thereby restricting or inhibiting rotation of the second input member 120 and the fourth ring gear member 54. As illustrated in FIG. 2, the electric machine 100 can replace clutch 92 and operate as the grounding device, wherein the electric machine 100 generates a reactive or counter torque to restrict or inhibit rotation of the fourth ring gear member 54 and the second input member 120, and thus, effectively grounds the fourth ring gear member 54.

In neutral, none of the clutches are carrying torque. However, it is appreciated that clutches 90 and 92 can be activated and engaged even though clutches 90 and 92 are not carrying any torque.

In forward fixed first gear ratio ($1^{st}$), as shown in Table 1, clutches 90, 92 and 80 are activated and thus providing coupling between connecting members.

In the forward fixed second gear ratio ($2^{nd}$), as shown in Table 1, clutches 90, 82 and 92 are activated and thus providing coupling between connecting members. The shift from first to second gear occurs by releasing clutch 80 and applying clutch 82 while maintaining application of clutches 90 and 92.

In the forward fixed third gear ratio ($3^{rd}$), as shown in Table 1, clutches 92, 82 and 80 are activated and thus providing coupling between connecting members. The shift from second to third occurs by releasing clutch 90 and applying clutch 80 while maintaining application of clutches 92 and 82.

In forward fixed fourth gear ratio ($4^{th}$), as shown in Table 1, clutches 92, 82 and 84 are activated and thus providing coupling between connecting members. The shift from third to fourth occurs by releasing clutch 80 and applying clutch 84 while maintaining application of clutches 92 and 82.

In forward fixed fifth gear ratio ($5^{th}$), as shown in Table 1, clutches 92, 80 and 84 are activated and thus providing coupling between connecting members. The shift from fourth to fifth occurs by releasing clutch 82 and applying clutch 80 while maintaining application of clutches 92 and 84.

It will be appreciated in fixed gear ratios one through five of the fixed gear state, rotation of the second input member 120 and the fourth ring gear member 54 relative to the housing 110 is blocked or inhibited in any direction due to selectively applying the clutch 92 to ground the fourth ring gear member 54. As aforementioned and illustrated in FIG. 2, the electric machine 100 operative as a grounding device can replace clutch 92 and generate a reactive or counter torque to ground the second input member 120 and the fourth ring gear member 54. Hence, in fixed gear ratios one through five of the fixed gear state, the transmission 10 transmits torque between the engine 5 (first torque generative device) and the driveline 81 when selected threes of clutches are activated and the electric machine 100 is selected to ground the fourth ring gear member 54 of the fourth planetary gear set 50.

In forward fixed sixth gear ratio ($6^{th}$), as shown in Table 1, clutches 82, 80 and 84 are activated and thus providing coupling between connecting members. The shift from fifth to sixth gear occurs by releasing clutch 92 and applying clutch 82 while maintaining application of clutches 80 and 84.

In forward fixed seventh gear ratio ($7^{th}$), as shown in Table 1, clutches 90, 80 and 84 are activated and thus providing coupling between connecting members. The shift from sixth to seventh gear occurs by releasing clutch 82 and applying clutch 90 while maintaining application of clutches 80 and 84.

In forward fixed eighth gear ratio ($8^{th}$), as shown in Table 1, clutches 90, 82 and 84 are activated and thus providing coupling between connecting members. The shift from seventh to eighth gear occurs by releasing clutch 80 and applying clutch 82 while maintaining application clutches 90 and 84.

It will be appreciated in forward fixed gear ratios six through eight, rotation of the second input member 120 and the fourth ring gear member 54 relative to the housing 110 is permitted in any direction due to the release of clutch 92 (grounding device). Thus, MA transmission mode can be enabled wherein the electric machine 100 and the engine 5 can generate tractive power transferred to the output member 14 in each of the forward fixed gear ratios six through eight. The MA transmission mode can alternatively be referred to as a motor-assisted fixed gear state. Likewise, the electric generation fixed gear states can be enabled wherein tractive power is transferred from the engine 5 to the output member 14 and electric charging power can be generated using the electric machine 100 via rotation of the second input member 120. Hence, in fixed gear ratios six through eight of the fixed gear state, the transmission 10 can transmit torque between the engine 5 (first torque generative device), the electric machine 100 (second torque generative device) and the driveline 81 in the motor-assisted fixed gear state (second torque generative device assisted fixed gear state) when selected threes of clutches are activated and the electric machine 100 is selected to transmit torque between the electric machine 100 and the fourth ring gear member 54 of the fourth planetary gear set 22.

The fixed gear states each provide a fixed ratio operation of input-to-output speed of the transmission 10. The fixed ratio operation of the input-to-output speed increases with increased fixed gear operation due to decreased gear ratios in the planetary gear sets 20, 30, 40 and 50. In forward fixed gear ratios six through eight, when operating in the MA transmission mode, the input-to-output speed of the transmission 10 remains fixed and the power output of the transmission 10 through the output member 14 is based upon the engine power and the electric machine power.

In the EV state, as shown in Table 1, clutches 90, 82 and 80 are activated and thus providing coupling to connecting members. It is appreciated that the application of clutches 90, 82 and 80 inhibit turning and rotation of the engine 5 and thus grounds the engine 5. Thus, the engine 5 is in the off-state and torque, $T_M$, from the electric machine 100 is transferred from the second input member 120 to the output member 14 of the integrated hybrid transmission 10 to drive the vehicle. Hence, the transmission 10 can transmit torque between the electric machine 100 (second torque generative device) and the driveline 81 in the EV state (second torque generative device state) when the electric machine 100 is selected to provide torque between the electric machine 100 and the fourth ring gear member 54 of the fourth planetary gear set 50, the engine 5 is in an off-state and selected threes of the plurality of clutches are activated. It will be appreciated that the input-to-output speed ratio between the second input member 120 and the output member is greater than 1:1, i.e., an underdrive ratio. The EV state can be useful for launching the vehicle from stop when the engine is off. When the engine 5 is in the off-state, the engine 5 is un-fueled and not spinning.

In the EVT state, as shown in Table 1, clutches 90 and 80 are activated and thus providing coupling to connecting members. The EVT state can include operating the torque machine 100 and the engine 5 to generate and transfer torque ($T_M$ and $T_E$, respectively) and power through the transmission 10 to the driveline 81 to drive the vehicle. The EVT state includes an engine start mode. It will be appreciated that the engine start mode can follow operation in the EV driving state, wherein the engine is required to be spinned from stop. The engine start mode of the EVT state operates to crank a crankshaft of the engine coupled to the first input member 12 from the engine off-state to the engine on-state, including during ongoing operation of the transmission 10 operating in the EVT state with clutches 90 and 80 activated. Hence, the engine start mode (the first torque generative device start mode) enables the transmission 10 to transmit torque from the electric machine 100 (second torque generative device) when the electric machine 100 is selected to transmit torque to the fourth ring gear member 54 of the fourth planetary gear set 22, the engine 5 (first torque generative device) is in the off-state and a selected pair of the plurality of clutches are activated. The shift from EV state to the EVT state occurs as follows: deactivating or releasing clutch 82 and maintaining application of clutches 90 and 80.

It will be further appreciated in situations where the engine is on but the vehicle is in standstill, such as neutral of the fixed gear state, the electric machine 100 can be operative as a motor to provide torque input ($T_M$) to launch the vehicle. In such a motor-assisted launching mode, clutch and/or motor/generator 100 configurations can be utilized to provide $T_M$ as an input to the integrated transmission 10. For instance, when the integrated transmission 10 is in neutral, clutches 90 and 80 can be activated to provide coupling between connecting members. It is appreciated that the electric machine 100 is required to provide torque for driving the vehicle, and thus, clutch 92 must remain deactivated to permit rotation of the second input member 120 and the fourth ring gear member 54 allowing the electric machine 100 to spin freely and provide $T_M$ directly into to the transmission 10 to the driveline 81 to launch the vehicle from standstill. Once the motor-assisted launch mode is accomplished, the transmission 10 may select a desired driving state. For instance, the transmission 10 may desire the forward fixed $1^{st}$ gear ratio of the fixed gear state, where the transmission 10 can shift to the first gear ratio by applying clutch 92 and maintaining application of clutches 90 and 80 to provide engagement between connecting members, and thus grounding the fourth ring gear member 54.

The transmission 10 can operate in the regenerative power braking mode by operating in forward fixed gear ratios six through eight of the fixed gear state to generate reactive power that is converted to storable power by reacting vehicle kinetic energy input to the transmission 10 via the driveline 81. The regenerative power braking mode can include operating with the engine 5 un-fueled and spinning or fueled and spinning.

It will be further appreciated that the transmission 10 can operate in the regenerative power braking mode by operating in either the EV state or the EVT state to generate reactive power that is converted to storable power by reacting vehicle kinetic energy input to the transmission 10 via the driveline 81. The regenerative power braking mode can include operating with the engine 5 un-fueled and spinning, un-fueled and not spinning (engine is grounded) or fueled and spinning. Thus, for the regenerative power braking mode to be enabled, clutch 92 (grounding device) must be deactivated to permit rotation of the second input member 120 and the fourth ring gear member 54 relative to the housing 110 in any direction.

The transmission 10 can operate in a charging state to charge the energy storage device, including transferring torque from the first input member 12 to the second input member 120 utilizing the electric machine 100 with all clutches deactivated. The electric machine 100 converts the torque to potential energy that is stored in the energy storage device.

Figure 3:
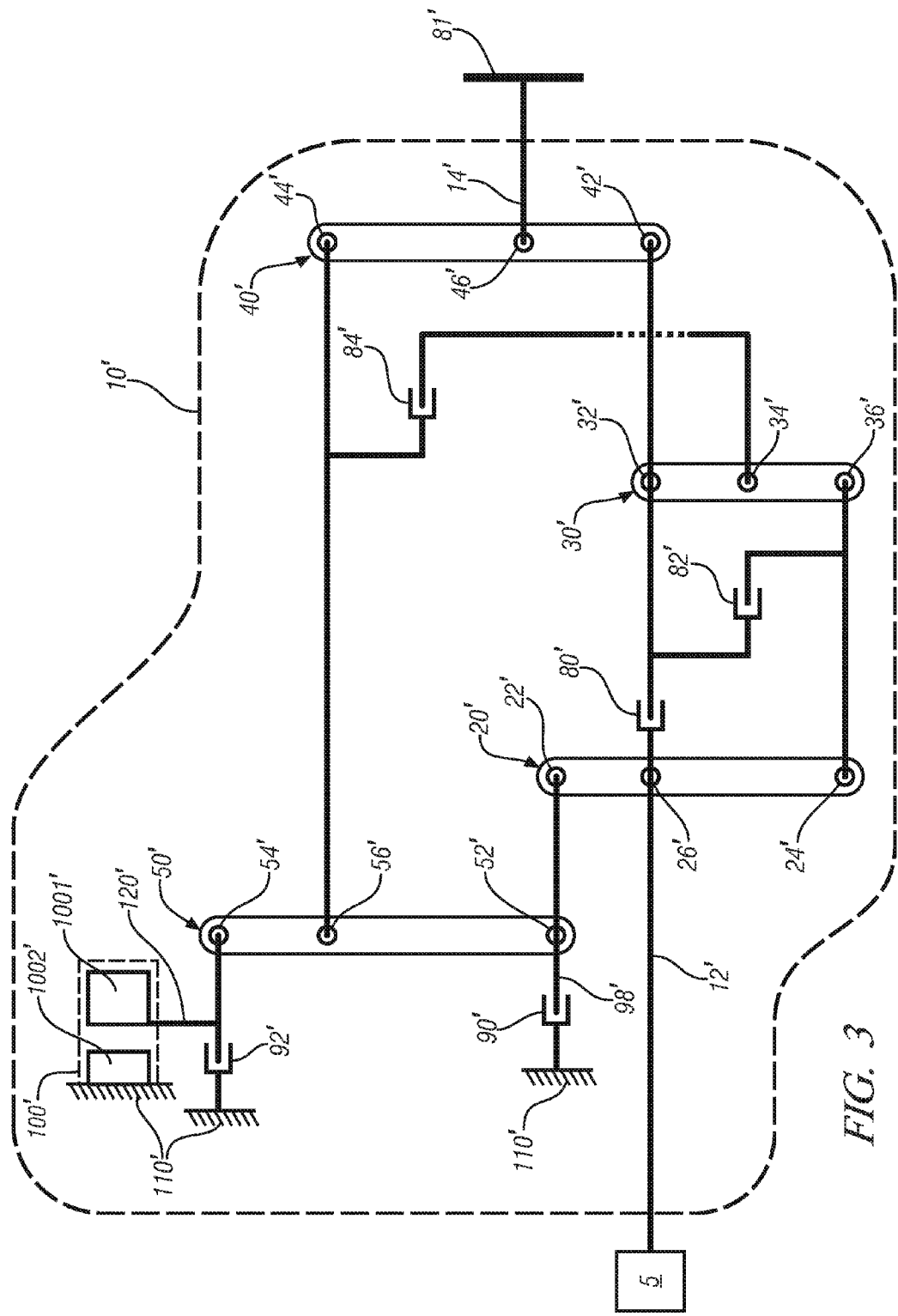
FIG. 3 illustrates a lever diagram of a second exemplary hybrid transmission including a plurality of planetary gear sets and associated selectively engageable clutches connecting a plurality of torque generative devices to a transmission input shaft, in accordance with the present disclosure.

FIG. 3 shows a lever diagram of an alternative embodiment of the integrated hybrid transmission 10'. The integrated hybrid transmission 10' includes an eight-speed integrated hybrid transmission including first and second transmission input members, a plurality of planetary gear sets and associated selectively engageable clutches transferring power flow from one of—or both of the first and second transmission input members through the planetary gear sets to a transmission output member as described above with reference to FIG. 1. The first transmission input member 12' (first input member 12') is mechanically coupled to a first torque generative device (engine 5') supplying engine torque, $T_E$. The second transmission input member 120' (first input member 120') is mechanically coupled to a second torque generative device (electric machine 100') supplying motor torque, $T_M$. The transmission output member 14' supplying output torque, $T_O$, is mechanically coupled with a vehicle driveline 81'.

The electric machine 100' includes an electric motor/generator. The electric machine 100' includes a rotor 1001' rotatably coupled to the second input member 120' and a stator 1002' integrated into a hardware structure, i.e., a housing 110' of the transmission 10'.

The transmission 10' transfers mechanical power among the engine 5', the electric machine 100' and the driveline 81'. The engine 5' and the electric machine 100', via the first and second input members 12',120', respectively, are controllable to generate mechanical power that can be used as tractive torque through the transmission 10' to the driveline 81'. The engine 5' and the transmission 10' are controllable to generate mechanical power that can be transferred to the electric machine 100' to generate electrical power. The transmission 10' is controllable to transfer mechanical power in the form of reactive torque from the output member 14' to the electric machine 100' to generate electrical power through regenerative braking.

The exemplary eight-speed transmission 10' includes planetary gear sets 20', 30', 40' and 50'. The intermediate members shown in FIG. 3, compared to the intermediate members shown in FIG. 1, couple different variations of the sun, ring and planet carrier members of the planetary gear sets 20', 30', 40' and 50' to respective sun, ring and planet carrier members of the planetary gear sets. The first planetary gear set 20' can include a first sun gear member 22', a first ring gear member 24' and a first planet carrier member 26' rotatably supporting a first plurality of planet gears configured to intermesh with the first sun gear member 22' and the first ring gear member 24'. The first sun gear member 22' is coupled for common rotation with a first outer member 98'. The first ring gear member 24' is coupled for common rotation with an intermediate member. The first planet carrier member 26' is coupled for common rotation with the first transmission input member 12'. Hence, the engine 5' is mechanically coupled to the first planetary gear set 20'.

The second planetary gear set 30' can be a compound planetary gear set having dual pinions in the exemplary embodiment of FIG. 3. The second planetary gear set 30' (e.g., compound planetary gear set 30') can include a second sun gear member 32', a second ring gear member 34' and a second planet carrier member 36' rotatably supporting a second plurality of planet gears configured to intermesh with both the second sun gear member 32' and the second ring gear member 34'. The second sun gear member 32' is coupled for common rotation with an intermediate member. The second ring gear member 34' is coupled for common rotation with an intermediate member. The second planet carrier member 36' is coupled for common rotation with the intermediate member coupled for common rotation with the first ring gear member 24' of the first planetary gear set 20'.

The third planetary gear set 40' includes a third sun gear member 42', a third ring gear member 44' and a third planet carrier member 46' rotatably supporting a third plurality of planet gears configured to intermesh with both the third sun gear member 42' and the third ring gear member 44'. The third sun gear member 42' is coupled for common rotation with the intermediate shaft coupled for common rotation with the second sun gear member 32' of the second planetary gear set 30' (e.g., compound planetary gear set 30'). The third ring gear member 44' is coupled for common rotation with an intermediate member. The third carrier member 46' is coupled for common rotation with the output member 14'.

The fourth planetary gear set 50' includes a fourth sun gear member 52', a fourth ring gear member 54' and a fourth planet carrier member 56' rotatably supporting a fourth plurality of planet gears configured to intermesh with both the fourth sun gear member 52' and the fourth ring gear member 54'. The fourth sun gear member 52' is coupled for common rotation with the first outer member 98' coupled for common rotation with the first sun gear member 22' of the first planetary gear set 20'. The fourth ring gear member 54' is coupled for common rotation with the second input member 120'. Hence, the electric machine 100' can be mechanically coupled to the fourth planetary gear set 50'. The fourth carrier member 56' is coupled for common rotation with the intermediate member coupled for common rotation with the third ring gear member 44' of the third planetary gear set 40'.

The transmission 10' operates by selective application of clutches 90',80',82',84' and 92'. In an exemplary embodiment of the present disclosure, clutches 80',82',84' include hydraulically-applied rotating friction clutches to couple associated intermediate members and clutches 90',92' include hydraulically-applied grounding devices that can be selectively activated to ground rotation of associated members to the transmission housing 110'.

In an exemplary embodiment of the present disclosure, the transmission 10' is selectively operative in a plurality of operating states, including a plurality of fixed gear states including a motor assisted (MA) transmission mode, electrically variable transmission state (EVT) and an electrical vehicle (EV) state. The EVT state can be referred to as a continuously variable transmission (CVT) state and the EV state can be referred to as an electric machine state (second generative torque device state). The MA transmission mode includes motor-assisted fixed gear states wherein tractive power is transferred to the output member 14' from the engine 5' and the electric machine 100' through the transmission 10' via the first and second input members 12',120', respectively. Furthermore, the plurality of fixed gear states can include electric generation fixed gear states wherein tractive power is transferred from the engine 5' to the output member 14' and electric charging power can be generated using the electric machine 100' via rotation of the second input member 120'. The generated electrical power can be used to charge the energy storage device.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus transmitting torque among a first torque generative device, a second torque generative device and an output member, comprising:
   a first planetary gear set including respective first, second and third members;
   a second planetary gear set including respective first, second and third members, the respective first member of the second planetary gear set mechanically coupled to the respective first member of the first planetary gear set;
   the first torque generative device mechanically coupled to the respective second member of the first planetary gear set through a first input member; and
   the second torque generative device mechanically coupled to the respective second member of the second planetary gear set through a second input member;
   a first selectively engageable grounding device disposed between the second member of the second planetary gear set and a transmission housing, said first selectively engageable grounding device including a grounding state wherein rotation of the respective second member of the second planetary gear set and the second input member is prevented and a rotational state wherein rotation of the respective second member of the second planetary gear set and the second input member is not prevented, wherein the first selectively engageable grounding device is always in the grounding state when the first input member is selectively mechanically coupled to the output member at first, second, third, fourth and fifth ones of a plurality of fixed forward speed ratios.

2. The apparatus of claim 1 further comprising a third planetary gear set including respective first, second and third members, the respective first member of the third planetary gear set mechanically coupled to the respective third member of the second planetary gear set, the respective second member of the third planetary gear set mechanically coupled to the output member.

3. The apparatus of claim 1, wherein the first torque generative device comprises an internal combustion engine and the second torque generative device comprises an electric machine.

4. The apparatus of claim 2 further comprising a fourth planetary gear set including respective first, second and third members, the respective first member of the fourth planetary gear set mechanically coupled to the respective third member of the first planetary gear set.

5. The apparatus of claim 4 further comprising:
   the respective second member of the fourth planetary gear set mechanically coupled to the respective second member of the third planetary gear set,
   a first selectively engageable clutch operably disposed between the respective third member of the third planetary gear set and the respective second member of the first planetary gear set,
   a second selectively engageable clutch operably disposed between the respective third member of the third planetary gear set and the respective third member of the first planetary gear set, and
   a third selectively engageable clutch operably disposed between the respective third member of the third planetary gear set and the respective third member of the fourth planetary gear set.

6. The apparatus of claim 4 further comprising:
   the respective second member of the fourth planetary gear set mechanically coupled to the respective third member of the third planetary gear set,
   a first selectively engageable clutch operably disposed between the respective third member of the third planetary gear set and the respective second member of the first planetary gear set;
   a second selectively engageable clutch operably disposed between the respective third member of the third planetary gear set and the respective third member of the first planetary gear set; and
   a third selectively engageable clutch operably disposed between the respective first member of the third planetary gear set and the respective third member of the fourth planetary gear set.

7. An integrated hybrid transmission device, comprising:
   a first planetary gear set including respective first, second and third members;
   a second planetary gear set including respective first, second and third members;
   a third planetary gear set including respective first, second and third members;
   a fourth planetary gear set including respective first, second and third members;
   the respective third member of the first planetary gear set mechanically coupled to the respective first member of the fourth planetary gear set;
   the respective first member of the first planetary gear set mechanically coupled to the respective first member of the second planetary gear set;
   the respective third member of the second planetary gear set mechanically coupled to the respective first member of the third planetary gear set;
   the respective second member of the fourth planetary gear set mechanically coupled to the respective second member of the third planetary gear set;
   a first input member mechanically coupled to the respective second member of the first planetary gear set;
   a second input member mechanically coupled to the respective second member of the second planetary gear set;
   an electric machine including a rotor and a stator, the rotor of the electric machine rotatably coupled to the second input member;
   an output member mechanically coupled to the respective second member of the third planetary gear set;
   a first selectively engageable grounding device disposed between the second member of the second planetary gear set and a transmission ground, said first selectively operable grounding device including a grounding state wherein rotation of the respective second member of the second planetary gear set and the second input member is prevented and a rotational state wherein rotation of the respective second member of the second planetary gear set and the second input member is not prevented, wherein the first selectively engageable grounding device is always in the grounding state when the first input member is selectively mechanically coupled to the output member at first, second, third, fourth and fifth ones of a plurality of fixed forward speed ratios;

a second selectively engageable grounding device disposed between the respective first member of the second planetary gear set said transmission ground;
a first selectively engageable clutch operably disposed between the respective third member of the third planetary gear set and the respective second member of the first planetary gear set;
a second selectively engageable clutch operably disposed between the respective third member of the third planetary gear set and the respective third member of the first planetary gear set; and
a third selectively engageable clutch operably disposed between the respective third member of the third planetary gear set and the respective third member of the fourth planetary gear set.

8. An integrated hybrid transmission device, comprising:
a first planetary gear set including respective first, second and third members;
a second planetary gear set including respective first, second and third members;
a third planetary gear set including respective first, second and third members;
a fourth planetary gear set including respective first, second and third members;
the respective third member of the first planetary gear set mechanically coupled to the respective first member of the fourth planetary gear set;
the respective first member of the first planetary gear set mechanically coupled to the respective first member of the second planetary gear set;
the respective third member of the second planetary gear set mechanically coupled to the respective first member of the third planetary gear set;
the respective second member of the fourth planetary gear set mechanically coupled to the respective second member of the third planetary gear set;
a first input member mechanically coupled to the respective second member of the first planetary gear set;
a second input member mechanically coupled to the respective second member of the second planetary gear set;
an electric machine including a rotor and a stator, the rotor of the electric machine rotatably coupled to the second input member;
an output member mechanically coupled to the respective second member of the third planetary gear set;
a first selectively engageable grounding device comprising the electric machine disposed between the second member of the second planetary gear set and a transmission ground, said first selectively operable grounding device including a grounding state wherein rotation of the respective second member of the second planetary gear set is prevented and a rotational state wherein rotation of the respective second member of the second planetary gear set is not prevented;
a second selectively engageable grounding device disposed between the respective first member of the second planetary gear set said transmission ground;
a first selectively engageable clutch operably disposed between the respective third member of the third planetary gear set and the respective second member of the first planetary gear set;
a second selectively engageable clutch operably disposed between the respective third member of the third planetary gear set and the respective third member of the first planetary gear set; and
a third selectively engageable clutch operably disposed between the respective third member of the third planetary gear set and the respective third member of the fourth planetary gear set.

9. The integrated hybrid transmission device of claim 7 wherein the first selectively engageable grounding device comprises a fourth selectively engageable clutch.

10. An integrated hybrid transmission device, comprising:
a first planetary gear set including respective first, second and third members;
a second planetary gear set including respective first, second and third members;
a third planetary gear set including respective first, second and third members;
a fourth planetary gear set including respective first, second and third members;
the respective third member of the first planetary gear set mechanically coupled to the respective first member of the fourth planetary gear set;
the respective first member of the first planetary gear set mechanically coupled to the respective first member of the second planetary gear set;
the respective third member of the second planetary gear set mechanically coupled to the respective first member of the third planetary gear set;
the respective second member of the fourth planetary gear set mechanically coupled to the respective second member of the third planetary gear set;
a first input member mechanically coupled to the respective second member of the first planetary gear set;
a second input member mechanically coupled to the respective second member of the second planetary gear set;
an electric machine including a rotor and a stator, the rotor of the electric machine rotatably coupled to the second input member;
an output member mechanically coupled to the respective second member of the third planetary gear set;
a first selectively engageable grounding device comprising the electric machine disposed between the second member of the second planetary gear set and a transmission ground, said first selectively operable grounding device including a grounding state wherein rotation of the respective second member of the second planetary gear set is prevented and a rotational state wherein rotation of the respective second member of the second planetary gear set is not prevented;
a second selectively engageable grounding device disposed between the respective first member of the second planetary gear set said transmission ground;
a first selectively engageable clutch operably disposed between the respective third member of the third planetary gear set and the respective second member of the first planetary gear set;
a second selectively engageable clutch operably disposed between the respective third member of the third planetary gear set and the respective third member of the first planetary gear set; and
a third selectively engageable clutch operably disposed between the respective third member of the third planetary gear set and the respective third member of the fourth planetary gear set;
wherein the first input member is selectively mechanically coupled to the output member at one of a plurality of fixed speed ratios when the first selectively engageable grounding device is in the grounding state, the second selectively engageable grounding device is engaged, only one of the first and second selectively engageable clutches is engaged, and the third selectively engageable clutch is disengaged.

11. The integrated hybrid transmission device of claim 10 wherein the first input member is selectively mechanically coupled to the output member at one of the plurality of fixed speed ratios when the first selectively engageable grounding device is in the grounding state, the second selectively engageable grounding device is disengaged, and only two of the first, second and third selectively engageable clutches are engaged.

12. The integrated hybrid transmission device of claim 11 wherein the first input member is selectively mechanically coupled to the output member at one of the plurality of fixed speed ratios when the first selectively engageable grounding device is in the rotational state, the second selectively engageable grounding device is disengaged, and all three of the first, second and third selectively engageable clutches are engaged.

13. The integrated hybrid transmission device of claim 12 wherein the first input member is selectively mechanically coupled to the output member at one of the plurality of fixed speed ratios when the first selectively engageable grounding device is in the rotational state, the second selectively engageable grounding device is engaged, only one of the first and second selectively engageable clutches is engaged, and the third selectively engageable clutch is engaged.

14. An integrated hybrid transmission device, comprising:
a first planetary gear set including respective first, second and third members;
a second planetary gear set including respective first, second and third members;
a third planetary gear set including respective first, second and third members;
a fourth planetary gear set including respective first, second and third members;
the respective third member of the first planetary gear set mechanically coupled to the respective first member of the fourth planetary gear set;
the respective first member of the first planetary gear set mechanically coupled to the respective first member of the second planetary gear set;
the respective third member of the second planetary gear set mechanically coupled to the respective first member of the third planetary gear set;
the respective second member of the fourth planetary gear set mechanically coupled to the respective second member of the third planetary gear set;
a first input member mechanically coupled to the respective second member of the first planetary gear set;
a second input member mechanically coupled to the respective second member of the second planetary gear set;
an electric machine including a rotor and a stator, the rotor of the electric machine rotatably coupled to the second input member;
an output member mechanically coupled to the respective second member of the third planetary gear set;
a first selectively engageable grounding device comprising the electric machine disposed between the second member of the second planetary gear set and a transmission ground, said first selectively operable grounding device including a grounding state wherein rotation of the respective second member of the second planetary gear set is prevented and a rotational state wherein rotation of the respective second member of the second planetary gear set is not prevented;

a second selectively engageable grounding device disposed between the respective first member of the second planetary gear set said transmission ground;
a first selectively engageable clutch operably disposed between the respective third member of the third planetary gear set and the respective second member of the first planetary gear set;
a second selectively engageable clutch operably disposed between the respective third member of the third planetary gear set and the respective third member of the first planetary gear set; and
a third selectively engageable clutch operably disposed between the respective third member of the third planetary gear set and the respective third member of the fourth planetary gear set;
wherein the first input member is selectively mechanically coupled to the output member at an electrically variable speed ratio based on a speed of the electric machine when the first selectively engageable grounding device is in the rotational state, the second selectively engageable grounding device is in the grounding state, the first selectively engageable clutch is engaged, and the second and third selectively engageable clutches are disengaged.

15. An integrated hybrid transmission device, comprising:
a first planetary gear set including respective first, second and third members;
a second planetary gear set including respective first, second and third members;
a third planetary gear set including respective first, second and third members;
a fourth planetary gear set including respective first, second and third members;
the respective third member of the first planetary gear set mechanically coupled to the respective first member of the fourth planetary gear set;
the respective first member of the first planetary gear set mechanically coupled to the respective first member of the second planetary gear set;
the respective third member of the second planetary gear set mechanically coupled to the respective first member of the third planetary gear set;
the respective second member of the fourth planetary gear set mechanically coupled to the respective second member of the third planetary gear set;
a first input member mechanically coupled to the respective second member of the first planetary gear set;
a second input member mechanically coupled to the respective second member of the second planetary gear set;
an electric machine including a rotor and a stator, the rotor of the electric machine rotatably coupled to the second input member;
an output member mechanically coupled to the respective second member of the third planetary gear set;
a first selectively engageable grounding device comprising the electric machine disposed between the second member of the second planetary gear set and a transmission ground, said first selectively operable grounding device including a grounding state wherein rotation of the respective second member of the second planetary gear set is prevented and a rotational state wherein rotation of the respective second member of the second planetary gear set is not prevented;
a second selectively engageable grounding device disposed between the respective first member of the second planetary gear set said transmission ground;

a first selectively engageable clutch operably disposed between the respective third member of the third planetary gear set and the respective second member of the first planetary gear set;

a second selectively engageable clutch operably disposed between the respective third member of the third planetary gear set and the respective third member of the first planetary gear set; and a third selectively engageable clutch operably disposed between the respective third member of the third planetary gear set and the respective third member of the fourth planetary gear set;

wherein the second input member is selectively mechanically coupled to the output member at a fixed speed ratio when the first selectively engageable grounding device is in the grounding state, the second selectively engageable grounding device is in the rotational state, the first and second selectively engageable clutches are engaged, and the third selectively engageable clutch is disengaged.

16. An integrated hybrid transmission device, comprising:

a first planetary gear set including respective first, second and third members;

a second planetary gear set including respective first, second and third members;

a third planetary gear set including respective first, second and third members;

a fourth planetary gear set including respective first, second and third members;

the respective third member of the first planetary gear set mechanically coupled to the respective first member of the fourth planetary gear set;

the respective first member of the first planetary gear set mechanically coupled to the respective first member of the second planetary gear set;

the respective third member of the second planetary gear set mechanically coupled to the respective first member of the third planetary gear set;

the respective second member of the fourth planetary gear set mechanically coupled to the respective third member of the third planetary gear set;

a first input member mechanically coupled to the respective second member of the first planetary gear set;

a second input member mechanically coupled to the respective second member of the second planetary gear set;

an electric machine including a rotor and a stator, the rotor of the electric machine rotatably coupled to the second input member;

an output member mechanically coupled to the respective second member of the third planetary gear set;

a first selectively engageable grounding device disposed between the second member of the second planetary gear set and a transmission ground, said first selectively operable grounding device including a grounding state wherein rotation of the respective second member of the second planetary gear set and the second input member is prevented and a rotational state wherein rotation of the respective second member of the second planetary gear set and the second input member is not prevented, wherein the first selectively engageable grounding device is always in the grounding state when the first input member is selectively mechanically coupled to the output member at first, second, third, fourth and fifth ones of a plurality of fixed forward speed ratios;

a second selectively engageable grounding device disposed between the respective first member of the second planetary gear set said transmission ground;

a first selectively engageable clutch operably disposed between the respective third member of the third planetary gear set and the respective second member of the first planetary gear set;

a second selectively engageable clutch operably disposed between the respective third member of the third planetary gear set and the respective third member of the first planetary gear set; and a third selectively engageable clutch operably disposed between the respective first member of the third planetary gear set and the respective third member of the fourth planetary gear set.

17. An integrated hybrid transmission device, comprising:

a first planetary gear set including respective first, second and third members;

a second planetary gear set including respective first, second and third members;

a third planetary gear set including respective first, second and third members;

a fourth planetary gear set including respective first, second and third members;

the respective third member of the first planetary gear set mechanically coupled to the respective first member of the fourth planetary gear set;

the respective first member of the first planetary gear set mechanically coupled to the respective first member of the second planetary gear set;

the respective third member of the second planetary gear set mechanically coupled to the respective first member of the third planetary gear set;

the respective second member of the fourth planetary gear set mechanically coupled to the respective third member of the third planetary gear set;

a first input member mechanically coupled to the respective second member of the first planetary gear set;

a second input member mechanically coupled to the respective second member of the second planetary gear set;

an electric machine including a rotor and a stator, the rotor of the electric machine rotatably coupled to the second input member;

an output member mechanically coupled to the respective second member of the third planetary gear set;

a first selectively engageable grounding device comprising the electric machine disposed between the second member of the second planetary gear set and a transmission ground, said first selectively operable grounding device including a grounding state wherein rotation of the respective second member of the second planetary gear set is prevented and a rotational state wherein rotation of the respective second member of the second planetary gear set is not prevented;

a second selectively engageable grounding device disposed between the respective first member of the second planetary gear set said transmission ground;

a first selectively engageable clutch operably disposed between the respective third member of the third planetary gear set and the respective second member of the first planetary gear set;

a second selectively engageable clutch operably disposed between the respective third member of the third planetary gear set and the respective third member of the first planetary gear set; and a third selectively engageable clutch operably disposed between the respective first member of the third planetary gear set and the respective third member of the fourth planetary gear set.

18. The integrated hybrid transmission device of claim 16 wherein the first selectively engageable grounding device comprises a fourth selectively engageable clutch.

* * * * *